United States Patent
Nagano et al.

(10) Patent No.: US 12,204,140 B2
(45) Date of Patent: Jan. 21, 2025

(54) GAIN FLATTENING FILTER, AND METHOD FOR MANUFACTURING GAIN FLATTENING FILTER

(71) Applicants: SUMITOMO ELECTRIC INDUSTRIES, LTD., Osaka (JP); SUMITOMO ELECTRIC OPTIFRONTIER CO., LTD., Yokohama (JP)

(72) Inventors: Shigehiro Nagano, Osaka (JP); Takemi Hasegawa, Osaka (JP); Jun Kinugasa, Yokohama (JP); Kazuaki Masui, Yokohama (JP)

(73) Assignees: SUMITOMO ELECTRIC INDUSTRIES, LTD, Osaka (JP); SUMITOMO ELECTRIC OPTIFRONTIER CO., LTD., Yokohama (JP)

( * ) Notice: Subject to any disclaimer, the term of this patent is extended or adjusted under 35 U.S.C. 154(b) by 187 days.

(21) Appl. No.: 17/917,493

(22) PCT Filed: Apr. 5, 2021

(86) PCT No.: PCT/JP2021/014504
§ 371 (c)(1),
(2) Date: Oct. 6, 2022

(87) PCT Pub. No.: WO2021/215232
PCT Pub. Date: Oct. 28, 2021

(65) Prior Publication Data
US 2023/0152514 A1 May 18, 2023

(30) Foreign Application Priority Data
Apr. 20, 2020 (JP) ................. 2020-074768

(51) Int. Cl.
*G02B 6/036* (2006.01)
*G02B 6/02* (2006.01)

(52) U.S. Cl.
CPC ..... *G02B 6/03694* (2013.01); *G02B 6/02052* (2013.01); *G02B 6/03622* (2013.01)

(58) Field of Classification Search
CPC ............................... G02B 6/021; G02B 6/255
See application file for complete search history.

(56) References Cited

U.S. PATENT DOCUMENTS

| 5,732,170 A | 3/1998 | Okude et al. |
| 6,104,852 A * | 8/2000 | Kashyap ................ G02B 6/021 385/37 |

(Continued)

FOREIGN PATENT DOCUMENTS

| AU | 2016202438 A1 | 2/2017 |
| CN | 101604048 A | 12/2009 |

(Continued)

*Primary Examiner* — Eric Wong
(74) *Attorney, Agent, or Firm* — Oliff PLC

(57) ABSTRACT

A gain flattening filter includes a first optical fiber that has a core, a first cladding, and a second cladding and that has a uniform composition in a length direction; and a pair of second optical fibers fused to both ends of the first optical fiber. The first optical fiber has a first section in which a slanted refractive index grating is formed and a pair of second sections connecting both ends of the first section to the pair of second optical fibers. The first cladding contains a photosensitive material whose refractive index increases upon irradiation with light having a specific wavelength. In the core, a tensile stress remains in the first section. An average MFD of the second sections is larger than an average MFD of the second optical fibers and smaller than an average MFD of the first section.

13 Claims, 6 Drawing Sheets

(56) References Cited

U.S. PATENT DOCUMENTS

| | | | |
|---|---|---|---|
| 2001/0019643 | A1 | 9/2001 | Yamauchi et al. |
| 2003/0063875 | A1* | 4/2003 | Bickham .............. G02B 6/0285 |
| | | | 385/127 |
| 2003/0156808 | A1 | 8/2003 | Sudo et al. |
| 2004/0151467 | A1 | 8/2004 | Ishikawa et al. |
| 2004/0218859 | A1 | 11/2004 | Yamashita et al. |
| 2017/0297947 | A1 | 10/2017 | Billings et al. |
| 2019/0154912 | A1 | 5/2019 | Nagano et al. |
| 2019/0196104 | A1 | 6/2019 | Ghiiringhelli et al. |

FOREIGN PATENT DOCUMENTS

| | | |
|---|---|---|
| JP | H09-113729 A | 5/1997 |
| JP | H10-227938 A | 8/1998 |
| JP | H11-038238 A | 2/1999 |
| JP | H11-084151 A | 3/1999 |
| JP | 2003-004926 A | 1/2003 |
| JP | 2003-075647 A | 3/2003 |
| JP | 2003-302547 A | 10/2003 |
| JP | 2016-081032 A | 5/2016 |
| JP | 2018-537385 A | 12/2018 |
| JP | 2019-095466 A | 6/2019 |
| WO | 03/093887 A1 | 11/2003 |
| WO | 2017/075161 A1 | 5/2017 |

\* cited by examiner

GAIN FLATTENING FILTER, AND METHOD FOR MANUFACTURING GAIN FLATTENING FILTER

TECHNICAL FIELD

The present disclosure relates to a gain flattening filter (GFF) and a method for manufacturing a GFF. The present application claims priority based on Japanese Patent Application No. 2020-074768 filed on Apr. 20, 2020, and the entire contents of the Japanese patent application are incorporated herein by reference.

BACKGROUND ART

A GFF including a slanted fiber grating (SFG) is known. Patent Literature 1 (PTL 1) describes an example of a manufacture of a GFF with a fiber Bragg grating (FBG). Patent Literature 2 (PTL 2) describes an example of a manufacture of an SFG. Patent Literature 3 (PTL 3) describes that a mode field diameter (MFD) of a region where a grating is formed is increased to 15 μm or more. The MFD in the present specification is an MFD at a wavelength of 1550 nm unless otherwise specified.

CITATION LIST

Patent Literature

PTL 1: Japanese Unexamined Patent Application Publication No. 2003-004926
PTL 2: International Patent Publication No. WO2003/093887
PTL 3: Japanese Unexamined Patent Application Publication No. 2003-075647
PTL 4: Japanese Unexamined Patent Application Publication No. H11-084151
PTL 5: Japanese Unexamined Patent Application Publication No. H11-038238
PTL 6: Japanese Patent Application No. 2014-211378

SUMMARY OF INVENTION

A gain flattening filter according to an embodiment of the present disclosure includes a first optical fiber that has a core, a first cladding surrounding the core from outside in a radial direction, and a second cladding surrounding the first cladding from outside in the radial direction and that has a uniform composition in a length direction; and a pair of second optical fibers fused to both ends of the first optical fiber. The first optical fiber has a first section in which a slanted refractive index grating is formed and a pair of second sections connecting both ends of the first section to the pair of second optical fibers. The first cladding contains a photosensitive material whose refractive index increases upon irradiation with light having a specific wavelength. In the core, a tensile stress remains in the first section. An average MFD of the second sections is larger than an average MFD of the second optical fibers and smaller than an average MFD of the first section.

A method for manufacturing a GFF according to an embodiment of the present disclosure includes fusing onto both ends of a first optical fiber a pair of second optical fibers, the first optical fiber being formed with a slanted refractive index grating and including a core, a first cladding surrounding the core from outside in a radial direction and containing a photosensitive material whose refractive index increases upon irradiation with light having a specific wavelength, and a second cladding surrounding the first cladding from outside in the radial direction, and the pair of second optical fibers each having an MFD smaller than an MFD of the first optical fiber. The fusing includes heating the first optical fiber and the pair of second optical fibers such that temperatures of the pair of second optical fibers are higher than temperatures of both the ends of the first optical fiber, and a tensile stress remaining in the core is released at both end portions of the first optical fiber to reduce average MFDs at both the end portions of the first optical fiber.

DESCRIPTION OF EMBODIMENTS

Figure 1:
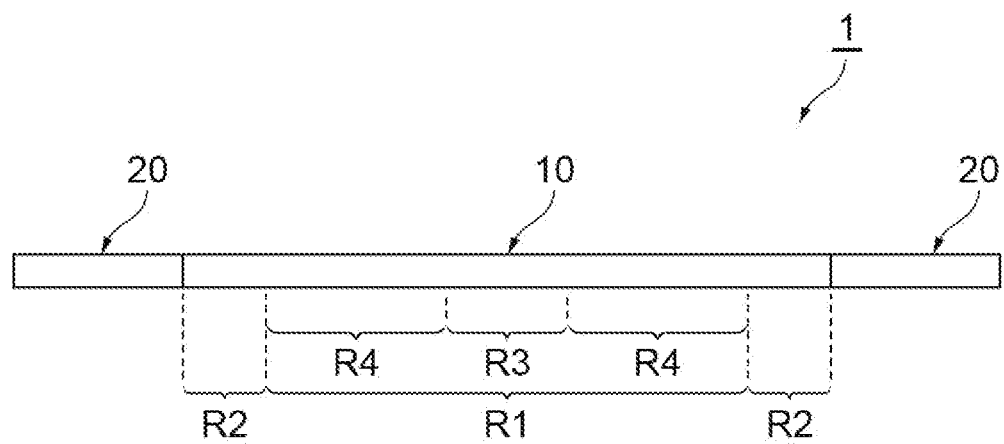
FIG. 1 is a diagram showing a configuration of a GFF according to an embodiment.

Problems to be Solved by Present Disclosure

When an MFD of a photosensitive fiber for forming an SFG is enlarged as in the invention described in PTL 3, for example, there is a problem that splice loss increases in fusing a single-mode fiber (SMF) having an MFD of about 10.5 μm to be used as a pigtail.

Therefore, an object of the present disclosure is to provide a gain flattening filter that can suppress splice loss and a method for manufacturing a gain flattening filter.

Advantageous Effects of Present Disclosure

According to the present disclosure, the splice loss can be suppressed.

Description of Embodiments of Present Disclosure

First, embodiments according to the present disclosure will be listed and described. A gain flattening filter according to an embodiment of the present disclosure includes a first optical fiber that has a core, a first cladding surrounding the core from outside in a radial direction, and a second cladding surrounding the first cladding from outside in the radial direction and that has a uniform composition in a length direction; and a pair of second optical fibers fused to both ends of the first optical fiber. The first optical fiber has a first section in which a slanted refractive index grating is formed and a pair of second sections connecting both ends of the first section to the pair of second optical fibers. The first cladding contains a photosensitive material whose refractive index increases upon irradiation with light having a specific wavelength. In the core, a tensile stress remains in the first section.

An average MFD of the second sections is larger than an average MFD of the second optical fibers and smaller than an average MFD of the first section.

In the GFF according to the above embodiment, the average MFD of the second sections is larger than the average MFD of the second optical fibers and smaller than the average MFD of the first section even though the first section and the second sections have the uniform composition. Therefore, an MFD difference is smaller than that in a case where the first section and the second optical fibers are connected to each other without the second sections. Therefore, splice loss can be suppressed.

A difference between the average MFD of the second sections and the average MFD of the second optical fibers may be 1.3 μm or less. In this case, the splice loss can be further suppressed.

The core may include silica-based glass and may not contain a dopant in such an amount that a relative refractive index difference of more than 0.01% with respect to pure silica is provided. The first cladding may contain fluorine. A fluorine concentration of the first cladding may be more than 0.40% and 0.75% or less in terms of a change in a relative refractive index with respect to pure silica. In this case, since the core contains substantially no dopant, the core can be harder than the cladding. Therefore, a tensile stress can be applied to the core. As a result, the MFD can be increased.

In the first section, a minimum value of the tensile stress remaining in the core may be 1 MPa or more and 200 MPa or less. In this case, the MFD is increased.

In the second sections, a stress remaining in the core may be a tensile stress lower than the tensile stress remaining in the core in the first section or a compressive stress. In this case, the MFDs in the second sections can be smaller than the MFD in the first section.

The average MFD of the first section may be 11 μm to 15 μm, or may be 12 μm to 15 μm. The average MFD of the second optical fibers may be 9.0 μm or more and 10.9 μm or less. In this case, a performance of the GFF can be improved. The second optical fibers can satisfy the standard of a single-mode optical fiber of ITU-T (International Telecommunication Union Telecommunication Standardization Sector) G. 652 which is widely used in optical components and transmission lines.

In the first section, the core may have a diameter of 8 μm to 10.5 μm. A relative refractive index difference of the core with respect to the first cladding may be 0.16% or more and 0.36% or less. In this case, light can be transmitted in a single mode at a wavelength of 1.55 μm.

The first cladding may have an inner peripheral region in contact with the core, and the photosensitive material may be contained in the inner peripheral region. In this case, a grating having a desired attenuation wavelength characteristic is easily formed.

MFDs of the pair of second optical fibers may increase toward the both ends of the first optical fiber. In this case, since the MFD difference between the first optical fiber and the second optical fibers is further reduced, the splice loss is further suppressed.

A method for manufacturing a GFF according to an embodiment includes fusing onto both ends of a first optical fiber a pair of second optical fibers, the first optical fiber being formed with a slanted refractive index grating and including a core, a first cladding surrounding the core from outside in a radial direction and containing a photosensitive material whose refractive index increases upon irradiation with light having a specific wavelength, and a second cladding surrounding the first cladding from outside in the radial direction, and the pair of second optical fibers each having an MFD smaller than an MFD of the first optical fiber. The fusing includes heating the first optical fiber and the pair of second optical fibers such that temperatures of the pair of second optical fibers are higher than temperatures of both the ends of the first optical fiber, and a tensile stress remaining in the core is released at both end portions of the first optical fiber to reduce average MFDs at both the end portions of the first optical fiber.

In the method for manufacturing the GFF according to the above embodiment, the tensile stress remaining in the core at both end portions of the first optical fiber is released by the fusing step. As a result, the average MFDs at both end portions of the first optical fiber are reduced and approach the MFDs of the pair of second optical fibers. Thus, the splice loss can be suppressed. Furthermore, a fusing temperature of the first optical fiber is prevented from becoming excessively high.

In the fusing, a fusing temperature may be 4000° C. or more and 6500° C. or less, and a fusing time may be 0.1 seconds or more and 100 seconds or less. In this case, while the MFD is reduced by releasing the tensile stress remaining in the core of the first optical fiber in a fused portion, an increase in the MFD due to diffusion of an additive can be suppressed.

The method may further include, before the fusing, heating an end portion, which is disposed on a side to be fused to the first optical fiber, of each of the pair of second optical fibers to be fused to both the ends of the first optical fiber to increase an MFD of the end portion. In this case, since the MFD difference between the first optical fiber and the second optical fibers is further reduced, the splice loss is further suppressed.

Details of Embodiments of Present Disclosure

Specific examples of an optical fiber according to the present disclosure will be described below with reference to the drawings. The present invention is not limited to these examples, but is defined by the claims, and is intended to embrace all the modifications within the meaning and scope equivalent to the claims. In the description of the drawings, the same elements are denoted by the same reference numerals, and redundant descriptions thereof will be omitted.

In a long-distance optical fiber communication system using a C-band or L-band signal light, an optical fiber amplifier including an amplifying optical fiber doped with erbium (Er) is used as an optical amplifier for amplifying the signal light. A gain of the erbium-doped fiber amplifier (EDFA) has a wavelength dependence, and has a peak at a wavelength of around 1.53 μm. A bit error rate increases due to a non-flatness of the wavelength dependence of the gain spectrum. As a result, a performance of a transmission system deteriorates. As a component for solving this problem, a GFF including an SFG has been developed.

A refraction index of silica-based glass containing a photosensitive material can be increased by irradiating an optical fiber in which both or either one of a core and a cladding is formed of silica-based glass containing the photosensitive material (e.g., $GeO_2$ or $B_2O_3$) with an ultraviolet light having a specific wavelength (e.g., a second harmonic wave of argon ion laser light (wavelength: 244 nm)) that can increase the refraction index. Methods of writing a refractive index modulation grating having a predetermined period in an optical fiber include an exposure using ±1-order diffracted light with a chirped grating phase mask, a direct exposure using UV laser light, and a two-beam interference exposure. Among them, the method using the phase mask is advantageous in that gratings having the same characteristics can be produced with good reproducibility, and alignment is relatively easy as compared with other methods.

A loss in SFG is caused by coupling of a light in a $LP_{01}$ mode propagating forward with a light in a higher-order mode propagating backward. A basic waveform, which is a loss waveform of the SFG, is obtained by a grating written with a light having a specific wavelength and a certain beam width. The basic waveform has a peak at a certain wavelength and has a certain full width at half maximum. In the basic waveform, the loss has a tail on a shorter wavelength side from the peak wavelength. A desired loss waveform of the SFG is realized by superimposing a plurality of basic waveforms. Thus, the gain of the EDFA is equalized by the loss obtained by superposing the plurality of basic waveforms.

In recent years, with the development of the use of IoT and big data, there has been a demand for a further reduction in the bit error rate as well as an increase in a transmission capacity. Therefore, a higher performance of the GFF is required. In order to improve the performance of the GFF, it is desired that a maximum loss amount of the SFG is large, and a full width at half maximum of the basic waveform is reduced (a band of the basic waveform is narrowed) with maintaining an ability to adjust to a target waveform. For this purpose, it is necessary to use a large-diameter optical fiber having an MFD of about 11.5 μm or more as an optical fiber in which the grating is written. On the other hand, in order to reduce a power consumption of the optical fiber amplifier, it is required to suppress a splice loss between a photosensitive fiber and an SMF having an MFD of about 10.5 μm. There is a trade-off relationship between an increase in the MFD of the photosensitive fiber for the purpose of a high-performance GFF and a reduction in the splice loss.

FIG. 1 is a diagram showing a configuration of a GFF according to an embodiment. As shown in FIG. 1, a GFF1 according to the embodiment includes a photosensitive fiber 10 (first optical fiber) and a pair of SMFs 20 (second optical fibers). The pair of SMFs 20 is fusion-spliced to both ends of photosensitive fiber 10 in a longitudinal direction (axial direction). Photosensitive fiber 10 and the pair of SMFs 20 are fusion-spliced by arc-discharge, for example.

Photosensitive fiber 10 has a first section R1 and a pair of second sections R2. A slanted refractive index grating is formed in first section R1. First section R1 is a constant portion that is not affected by fusion-splicing (discharge). First section R1 has a third section R3 in which the slanted refractive index grating is formed, and a pair of fourth sections R4. Third section R3 is a partial section in an axial direction in first section R1, and has the slanted refractive index grating formed in the entire axial direction. The pair of fourth sections R4 is disposed on both sides of third section R3. The pair of fourth sections R4 connects both ends of third section R3 and the pair of second sections R2 to each other. An inclination of the slanted refractive index grating has the same definition as that described in PTL 3, and a range of the inclination is 0.2° to 4°.

The pair of second sections R2 forms both end portions of photosensitive fiber 10 and are affected by fusion-splicing (discharge). The pair of second sections R2 connects both ends of first section R1 to the pair of SMFs 20. The pair of second sections R2 includes both ends of photosensitive fiber 10.

In GFF1, an average MFD of second sections R2 is larger than an average MFD of SMFs 20 and smaller than an average MFD of first section R1. The average MFD of first section R1 is 11.0 μm to 15.0 μm, and more preferably 12.0 μm to 15.0 μm. The average MFD of second sections R2 is 11.0 μm to 13.0 μm, and more preferably 11.5 μm to 12.0 μm. The average MFD of SMFs 20 is set to meet the standard of ITU-T G. 652. That is, the average MFD of SMFs 20 is 9.9 μm to 10.9 μm. A boundary between first section R1 and second sections R2 is defined at a position where the average MFD of first section R1 is reduced by 0.1 μm between first section R1 and second sections R2.

Figure 2:
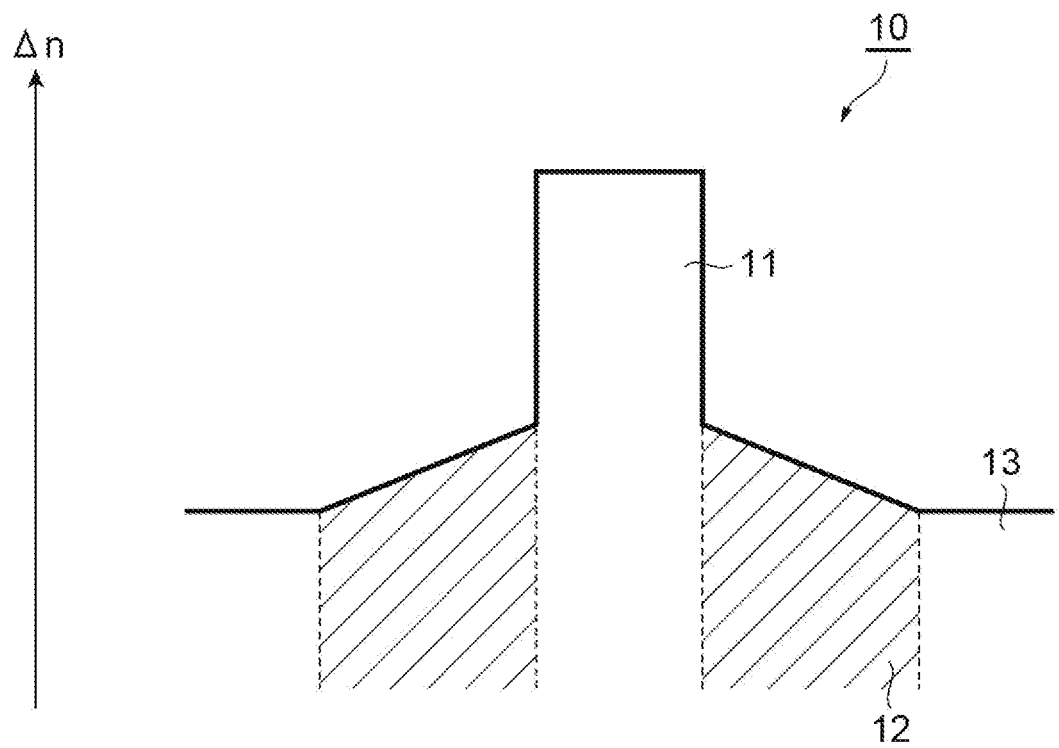
FIG. 2 is a diagram showing a refractive index profile of a photosensitive fiber along a diameter of an optical fiber.

FIG. 2 is a diagram showing a refractive index profile of a photosensitive fiber along the diameter of the optical fiber. As shown in FIG. 2, photosensitive fiber 10 has a core 11, a first cladding 12 (optical cladding) surrounding core 11 from outside in a radial direction, and a second cladding 13 (jacket) surrounding first cladding 12 from outside in the radial direction. A refractive index of first cladding 12 is lower than that of core 11. A refractive index of second cladding 13 is lower than that of core 11 and lower than an average refractive index of first cladding 12.

In first section R1, a relative refractive index difference of core 11 with respect to first cladding 12 is 0.16% to 0.36%. In second sections R2 affected by fusion-splicing, a relative refractive index difference of core 11 with respect to first cladding 12 is higher than that in first section R1.

Core 11 is formed of silica-based glass. Core 11 is formed of, for example, pure silica glass or non-photosensitive glass. Core 11 does not contain a dopant in such an amount that changes the relative refractive index difference of core 11 with respect to pure silica ($SiO_2$) by 0.01% or more. That is, the relative refractive index difference of core 11 with respect to pure silica ($SiO_2$) is less than 0.01%. In each of first section R1 and second sections R2, a diameter of core 11 (core diameter) is 8.0 μm to 10.5 μm.

First cladding 12 is formed of silica-based glass. First cladding 12 has an inner peripheral region in contact with core 11. At least the inner peripheral region includes a photosensitive material whose refractive index is increased upon irradiation with light having a specific wavelength. First cladding 12 may include a photosensitive material in the entire region in the radial direction. First cladding 12 may further include fluorine. In this case, a fluorine concentration of first cladding 12 is more than 0.40% and 0.75% or less in terms of a change in a relative refractive index with respect to pure silica.

First cladding 12 includes, for example, $GeO_2$ or $B_2O_3$ as a photosensitive material. An amount of $GeO_2$ added is, for example, 0.35% to 0.50% in terms of relative refractive index difference with respect to pure silica. An amount of $B_2O_3$ added is, for example, 0.05% to 0.55% in terms of relative refractive index difference with respect to pure silica. The photosensitive material is not substantially contained in core 11 and second cladding 13. The amount of $GeO_2$ and amount of $B_2O_3$ added to each of core 11 and second cladding 13 are both zero.

A fiber grating can be formed in a region containing the photosensitive material in first cladding 12 by periodic refractive index modulation. A fiber arrangement in the region where the fiber grating is formed is straight. That is, in the present embodiment, third section R3 is a straight region that is arranged straight, and the pair of fourth sections R4, the pair of second sections R2, and the pair of SMFs 20 are routing regions.

An MFD of third section R3 depends on a relative refractive index difference $\Delta n_{clad1+uv}$ of first cladding 12 increased upon irradiating a photosensitive material with light of a specific wavelength. An MFD of fourth section R4 depends on a relative refractive index difference $\Delta n_{clad1}$ of first cladding 12 under irradiation with non-UV light. The MFD of fourth section R4 is preferably 11.0 µm to 15.0 µm, and more preferably 12.0 µm to 15.0 µm. A boundary portion of fourth section R4 with third section R3 has an MFD conversion structure in which the relative refractive index difference increases toward third section R3 from $\Delta n_{clad1}$ to $\Delta n_{clad1+uv}$.

Here, $\Delta n_{clad1}$ is a value taken by an approximate straight line of a refractive-index profile in first cladding 12 at a boundary between core 11 and first cladding 12. The approximate straight line of the refractive index profile in first cladding 12 is a straight line connecting two points of refractive indices that are a refractive index at a position 1.0 µm away from the boundary between core 11 and first cladding 12 toward the outside with reference to the center of the core, and a refractive index at a position 1.0 µm away from a boundary between second cladding 13 and first cladding 12 toward the center of the core.

A Ge concentration in first cladding 12 is graded in a radial direction. The gradient of the Ge concentration from a portion adjacent to core 11 to a portion adjacent to second cladding 13 in the radial direction (i.e., a slope or a gradient of the Ge concentration profile (a change in relative refractive index difference/a distance from the boundary between core 11 and first cladding 12 to the boundary between first cladding 12 and second cladding 13)) is −0.013 [%/µm]. The boundary between core 11 and first cladding 12 is defined at a position where a gradient of the refractive index in a direction from core 11 to first cladding 12 becomes a negative maximum. The boundary between first cladding 12 and second cladding 13 is defined at a position closest to the center of the core where a gradient of the refractive index becomes zero in a direction from the boundary between core 11 and first cladding 12 toward an outer periphery.

First cladding 12 includes fluorine (F) as a down-dopant to decrease a refractive index. In each of first section R1 and second sections R2, a diameter of first cladding 12 (first cladding diameter) is 27.0 µm to 40.0 µm.

Second cladding 13 is formed of silica-based glass. Second cladding 13 includes fluorine (F) as a down-dopant to decrease a refractive index. A diameter of second cladding 13 (second cladding diameter) is 124.0 µm to 126.0 µm.

In photosensitive fiber 10, an element may be diffused in a radial direction in a cross section perpendicular to a longitudinal axis (axial direction) due to an influence of discharge, as described later. In the present specification, photosensitive fiber 10 is said to have a uniform composition in the longitudinal direction when a total amount of the element in each of cross sections perpendicular to the axial direction does not change even though a distribution of the element in each of the cross sections perpendicular to the axial direction changes.

In first section R1, a tensile stress applied during drawing remains in core 11 and first cladding 12. A minimum tensile stress remaining in core 11 is preferably 1 MPa to 200 MPa, and more preferably 5 MPa to 100 MPa. The tensile stress remaining in first cladding 12 is 0.5 MPa to 100 MPa, and more preferably 3 MPa to 60 MPa.

In contrast, in second sections R2, a tensile stress is thermally relaxed by applying heat caused by discharge fusion-splicing. For this reason, in second sections R2, the tensile stress remaining in each of core 11 and first cladding 12 is lower than that in first section R1, or turns to a compressive stress. In second sections R2, the refractive index of core 11 increases due to the relaxation of the tensile stress of core 11. An amount of increase in the refractive index of core 11 is in a range of 0.005% to 0.100% in terms of relative refractive index difference with respect to pure silica. In second sections R2, since the refractive index difference of core 11 increases, the MFD decreases from about 12.0 µm to about 11.0 µm.

A tensile stress is adjusted by drawing conditions of a preform to be the above fiber structure. For example, by setting a drawing tension to $9.8 \times 10^{-2}$ N to $29.4 \times 10^{-2}$ N, a tensile stress of 1 MPa to 200 MPa, more preferably 5 MPa to 100 MPa, is imparted to the core of the optical fiber after the drawing. A tensile stress of 0.5 MPa to 100 MPa, more preferably 3 MPa to 60 MPa, is imparted to the first cladding of the optical fiber.

The drawing tension is applied to a fiber based on a temperature and a drawing speed of a drawing furnace. The temperature of the drawing furnace is preferably 1800° C. or higher, and more preferably 1900° C. or higher. The drawing speed is 10 m/min to 1000 m/min, and more preferably 20 m/min to 500 m/min.

Each of SMFs 20 has a core and a cladding surrounding the core from outside in a radial direction. The refractive index of the cladding is lower than that of the core. Each of SMFs 20 is fusion-spliced to photosensitive fiber 10 and has a section that is affected by discharge, at one end. The core is formed of silica-based glass. The core includes $GeO_2$ as an up-dopant to increase a refraction index. The cladding is formed of silica-based glass. The cladding may be pure silica (pure quartz) or may contain fluorine.

One end portion of each of SMFs 20 fusion-spliced to photosensitive fiber 10 may be subjected to a thermally expanded core (TEC) process. That is, MFDs of SMFs 20 may increase toward both ends of photosensitive fiber 10. In this case, since an MFD difference between photosensitive fiber 10 and SMFs 20 is further reduced, the splice loss is further suppressed.

Next, a method for manufacturing GFF1 will be described. The method for manufacturing GFF1 includes a step of fusion-splicing a pair of SMFs to be a pair of SMFs 20 to both ends of a photosensitive fiber to be photosensitive fiber 10. The fusion-splicing step is performed in a state in which the central axes of the photosensitive fiber and each of the SMFs are aligned with each other and the end surfaces thereof are in contact with each other. In the fusion-splicing step, heat near a softening point temperature of the photosensitive fiber is applied to a pair of both end portions of the photosensitive fiber. Therefore, a tensile stress remaining in a core is released at the pair of both end portions of the photosensitive fiber to thereby reduce MFDs at the pair of both end portions of the photosensitive fiber.

This results in GFF1 including photosensitive fiber 10 and a pair of SMFs 20. The pair of both end portions of the photosensitive fiber becomes a pair of second sections R2 of photosensitive fiber 10. The MFDs in the pair of second sections R2 are converted to, for example, MFDs smaller than 11.5 µm. As a result, since an MFD difference between photosensitive fiber 10 and SMFs 20 becomes small, the splice loss is reduced.

A fusion-splicing temperature (a temperature of arc plasma) is, for example, 4000° C. to 6500° C. When the fusion-splicing temperature is within the above range, the MFD of photosensitive fiber 10 in second sections R2 can be reduced, although depending on a fusion-splicing time.

A fusion-splicing time is, for example, 0.1 seconds to 100 seconds. That is, a contact portion where an end face of the photosensitive fiber and an end face of each of the SMFs are in contact with each other is heated by arc plasma at a temperature of 4000° C. to 6500° C. for a period of 0.1 seconds to 100 seconds. When a fusion-splicing temperature is 3500° C. or lower, the fusion-splicing time is required to be 100 seconds or more. This is not appropriate in consideration of a diffusion coefficient of fluorine. A fusion-splicing temperature of 4000° C. or higher can shorten the fusion-splicing time.

The fusion-splicing step is performed, for example, with arranging a pair of discharge needles across a contact portion where the end face of the photosensitive fiber and the end face of each of the SMFs are in contact with each other. In the photosensitive fiber and each of the SMFs, since a largest heat is applied to a portion interposed between the pair of discharge needles, the temperature of this portion becomes a highest temperature. For example, when the pair of discharge needles is arranged with the contact portion interposed therebetween, the largest heat is applied to the contact portion, and thus the temperature of the contact portion becomes the highest temperature in the photosensitive fiber and the SMFs.

The fusion-splicing step may be performed such that the discharge needles are shifted from the contact portion toward an SMF side, and a temperature at a position shifted from the contact portion toward the SMF side is higher than a temperature of the contact portion. That is, the temperature at the position shifted from the contact portion toward the SMF side is a highest temperature. A method for shifting the position of the discharge needles is used, for example, when the photosensitive fiber in the contact portion is exposed to arc plasma exceeding the upper limit of the above-described temperature range (4000° C. to 6500° C.) with the pair of discharge needles arranged so as to interpose the contact portion therebetween. The positions of the discharge needles are arranged so as to apply an appropriate heat to each of positions of the photosensitive fiber and the SMFs. This makes it possible to perform fusion-splicing under appropriate fusion-splicing conditions.

A fiber grating to which periodic refractive index modulation is imparted by periodically releasing a residual tensile stress of an optical fiber has been reported (PTL 5). However, it is clear that the fiber grating reported in PTL 5 is different from the present embodiment which focuses on releasing a residual tensile stress of an optical fiber to reduce an MFD of a portion of the same optical fiber, thereby reducing the splice loss with SMFs.

The method for manufacturing GFF1 may further include performing, before the fusion-splicing, a TEC process on an end portion of each of the pair of SMFs to be fusion-spliced to both the ends of the photosensitive fiber. According to the TEC process, one end portion of each of the pair of SMFs to be fusion-spliced to both the ends of the photosensitive fiber is heated, and the MFD of the one end portion can be increased. In this case, since the MFD difference between photosensitive fiber 10 and SMFs 20 is further reduced, the splice loss is further suppressed.

Figure 3:
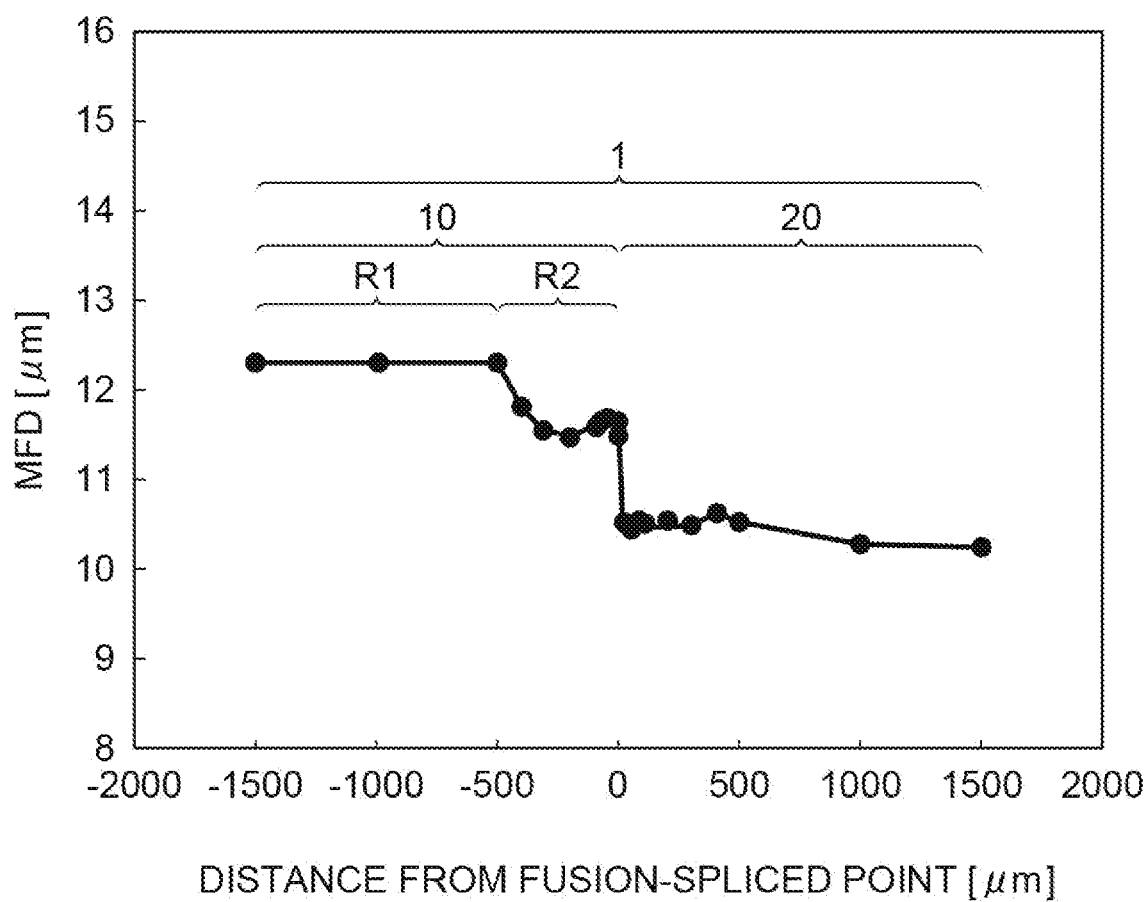
FIG. 3 is a graph showing a relationship between a distance from a fusion-spliced point and an MFD in a GFF according to a first example.

FIG. 3 is a graph showing a relationship between a distance from a fusion-spliced point and an MFD in a GFF according to the first example. A horizontal axis is a distance (μm) from the fusion-spliced point. The origin, 0 μm, indicates a position where a photosensitive fiber and each of SMFs are in contact with each other. The negative side indicates a position in the photosensitive fiber, and the positive side indicates a position in each of the SMFs. A vertical axis is an MFD. For the sake of clarity, in FIG. 3, the same reference numerals are used as those in the above embodiment, but the above embodiment is not limited to the first example.

The GFF according to the first example was manufactured by fusion-splicing a photosensitive fiber and a pair of SMFs using arc discharge based on the above-described manufacturing method. The center position of a pair of discharge needles was a position shifted by 100 μm toward the positive side (SMF side) from a position interposing the contact portion. That is, the fusion-splicing step was performed such that the temperatures at positions shifted by 100 μm from both ends of the photosensitive fiber toward the SMF side were higher than the temperatures at both the ends of the photosensitive fiber. As discharge conditions, a fusion-splicing temperature was set to 4000° C. to 6500° C., and a fusion-splicing time was set to 0.1 seconds to 100 seconds. The fusion-splicing time was preferably 0.5 seconds to 10 seconds.

As shown in FIG. 3, in the photosensitive fiber, an MFD at a position which is at distance of −500 μm from the fusion-spliced point is 12.3 μm, and is the same as that in the first section (constant portion) that is not affected by discharge. That is, in the photosensitive fiber according to the first example, a range in which a distance from the fusion-spliced point is −500 μm or less corresponds to the first section, and an MFD (average MFD) in this range is 12.3 μm. In the photosensitive fiber, a range in which a distance from the fusion-spliced point is −500 μm to 0 μm corresponds to the second section, and an MFD changes due to an influence of the discharge. An average MFD in the range (second section) is 11.6 μm.

An MFD is reduced to about 11.5 μm as a distance from the fusion-spliced point increases from −500 μm to −200 μm. The reason for this will be described with reference to FIGS. 5 and 6. At a position which is at a distance of −20 μm from the fusion-spliced point, an MFD slightly increases to 11.7 μm.

In each of the SMFs, an MFD gradually increases from a vicinity of 1000 μm to a vicinity of 500 μm in a distance from the fusion-spliced point, and slightly increases to about 10.5 μm in the vicinity of 500 μm. When a distance from the fusion-spliced point is from the vicinity of 500 μm to 20 μm, an MFD remains at substantially the same level. An average MFD of the SMFs is 10.5 μm. In the GFF according to the first example, an MFD changes by 1.2 μm in a range in which a distance from the fusion-spliced point is −20 μm to 20 μm. In the GFF according to the first example, a difference between the average MFD of the second sections of the photosensitive fiber and the average MFD of the SMFs is 1.3 μm or less. A splice loss was 0.03 dB, and was successfully reduced to lower than 0.10 dB.

Figure 4:
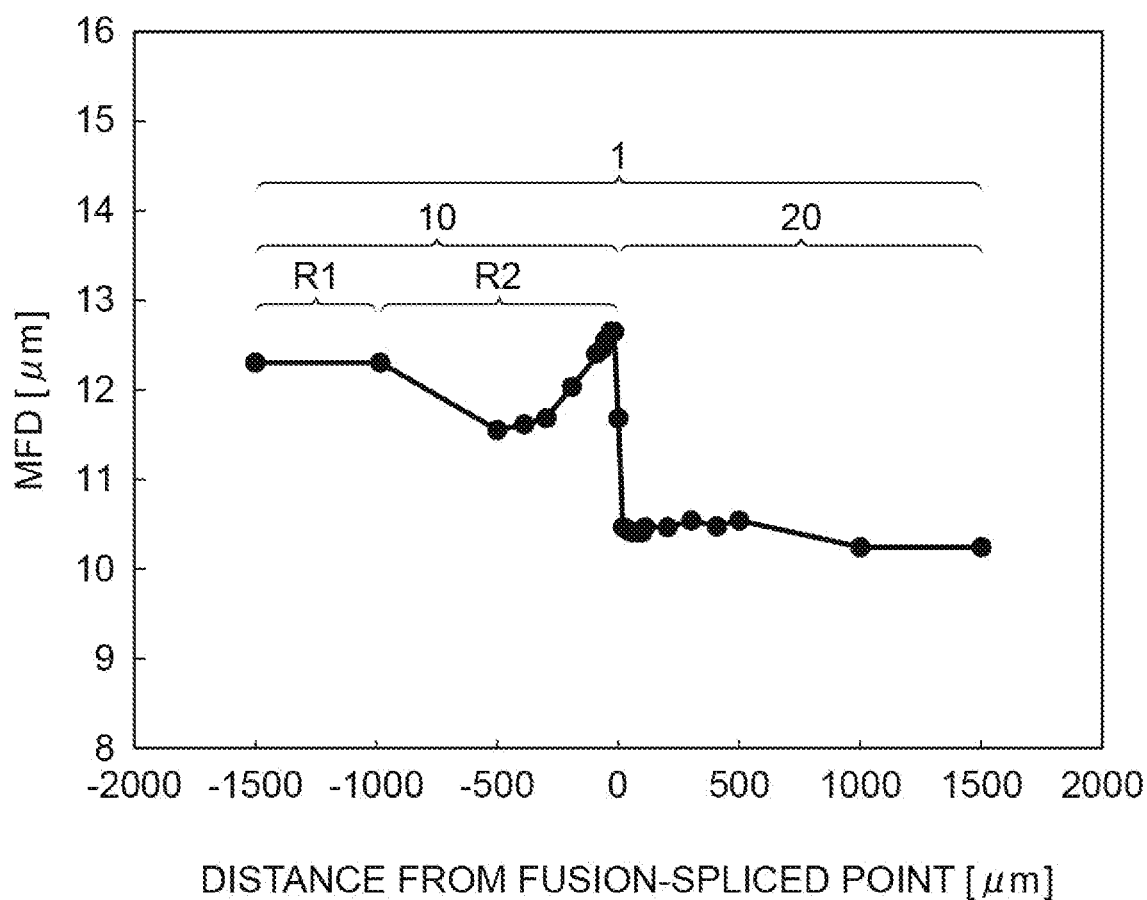
FIG. 4 is a graph showing a relationship between a distance from a fusion-spliced point and an MFD in a GFF according to a second example.

FIG. 4 is a graph showing a relationship between a distance from the fusion-spliced point and an MFD in a GFF according to the second embodiment. A horizontal axis and a vertical axis are the same as in FIG. 3.

The GFF according to the second embodiment was manufactured by fusion-splicing a photosensitive fiber and a pair of SMFs using arc discharge based on the above-described manufacturing method. A pair of discharge needles was positioned so as to interpose a contact portion, and were manufactured by fusion-splicing using arc discharge.

As shown in FIG. 4, a range in which a distance from the fusion-spliced point in the photosensitive fiber is −1000 μm or less corresponds to the first section (constant portion) that is not affected by discharge, and an MFD in this range is 12.3 μm. A range in which a distance from the fusion-spliced point in each of the SMFs is 1000 μm or more corresponds to a section (constant portion) that is not affected by discharge, and an MFD (average MFD) of the range (first section) is 10.2 µm.

In the photosensitive fiber, a range in which a distance from the fusion-spliced point is −1000 µm to 0 µm corresponds to the second section, and an MFD in this range changes due to the influence of the discharge. An average MFD in the range (second section) is 11.9 µm. As a distance from the fusion-spliced point increases from −1000 µm to −500 µm, an MFD decreases to about 11.5 µm. The MFD rapidly increases as the distance from the fusion-spliced point increases from −200 µm to 0 µm. An MFD at a distance of −20 µm from the fusion-spliced point is larger than that in the first section and is about 12.7 µm.

In each of the SMFs, an MFD slightly increases from 10.2 µm to 10.5 µm as a distance from the fusion-spliced point decreases from 1000 µm to 500 µm. When a distance from the fusion-spliced point is 500 µm to 20 µm, an MFD remains at substantially the same level. An average MFD of the SMFs is 10.3 µm in a range where the SMFs are affected by the discharge, around the fusion-spliced point at 0 µm. The range affected by the discharge is a range having an MFD larger by 0.2 µm or more than an average $MFD_{1000-5000}$ in a range from 1000 µm to 5000 µm. In the second embodiment, the affected range is from 0 µm to 700 µm. In the GFF according to the second embodiment, the MFD changes by 2.5 µm in a range in which the distance from the fusion-spliced point is −20 µm to 20 µm. The splice loss was 0.21 dB, and was an order of magnitude higher than that of the first example.

Figure 5:
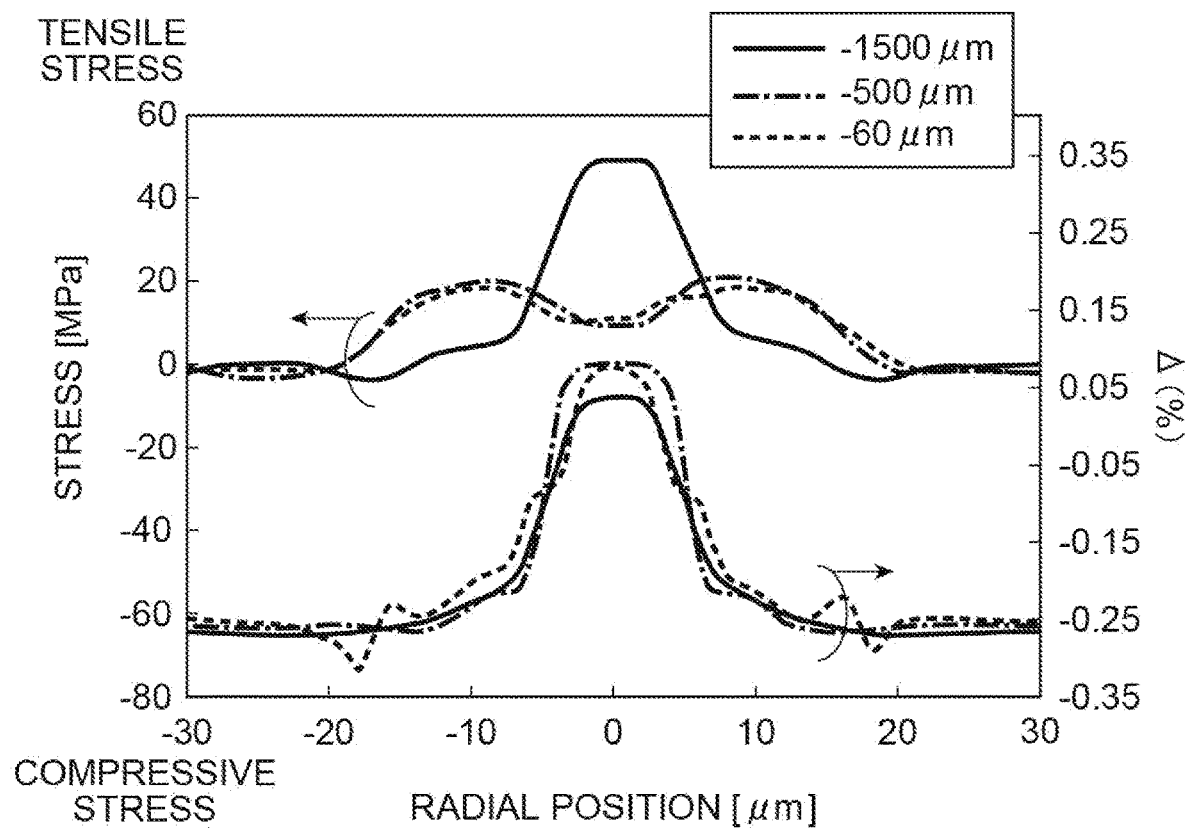
FIG. 5 is a graph showing a residual stress profile and a refractive index profile of a photosensitive fiber according to the first example along a diameter of the optical fiber.

FIG. 5 is a graph showing a residual stress profile and a refractive index profile of a photosensitive fiber according to the first example along the diameter of the optical fiber. A horizontal axis is a position on a diameter (a radial position). A left vertical axis is a residual stress. The positive side indicates a tensile stress, and the negative side indicates a compressive stress. A right vertical axis is a relative refractive index difference of the core with respect to the first cladding. The residual stress profile and the refractive index profile in the radial direction were each measured at positions which are at distances of −1500 µm, −500 µm, and −60 µm from the fusion-spliced point.

As shown in FIG. 5, the residual stress of the core is a tensile stress. When a distance from the fusion-spliced point is −1500 µm to −500 µm, the residual tensile stress is released by heat application using the discharge, and the difference between the relative refractive index differences of the core with respect to the second cladding before and after the release increases to 0.038%. As a result, it was found that the MFD of the photosensitive fiber was reduced from 12.3 µm at −1500 µm in the constant portion (first section) to 11.5 µm at −500 µm.

Such a reduction in MFD will be described with reference to FIG. 5. It can be seen that the refractive index profile at a measurement position of −60 µm fluctuates from an interface between the core and the first cladding to the first cladding, as compared to the refractive index profile at a measurement position of −1500 µm.

As compared to the refractive index profile at a measurement position of −500 µm, in the refractive index profile at a measurement position of −60 µm, the relative refractive index difference of the core with respect to pure silica decreases in a central region where the radial position is −5 µm to 5 µm, and increases in an outer peripheral region where the radial position is less than −5 µm or more than 5 µm. This behavior was found to be a result of fluorine added to the first cladding diffusing into the core and the second cladding. It was found that the diffusion of fluorine increased the refractive index of the first cladding and reduced the core diameter, resulting in an increase in the MFD. Under the fusion-splicing conditions in the first example, the diffusion amount of Ge was small as compared with the diffusion amount of fluorine, and was at a negligible level in terms of a degree of contribution to a change in the MFD.

Figure 6:
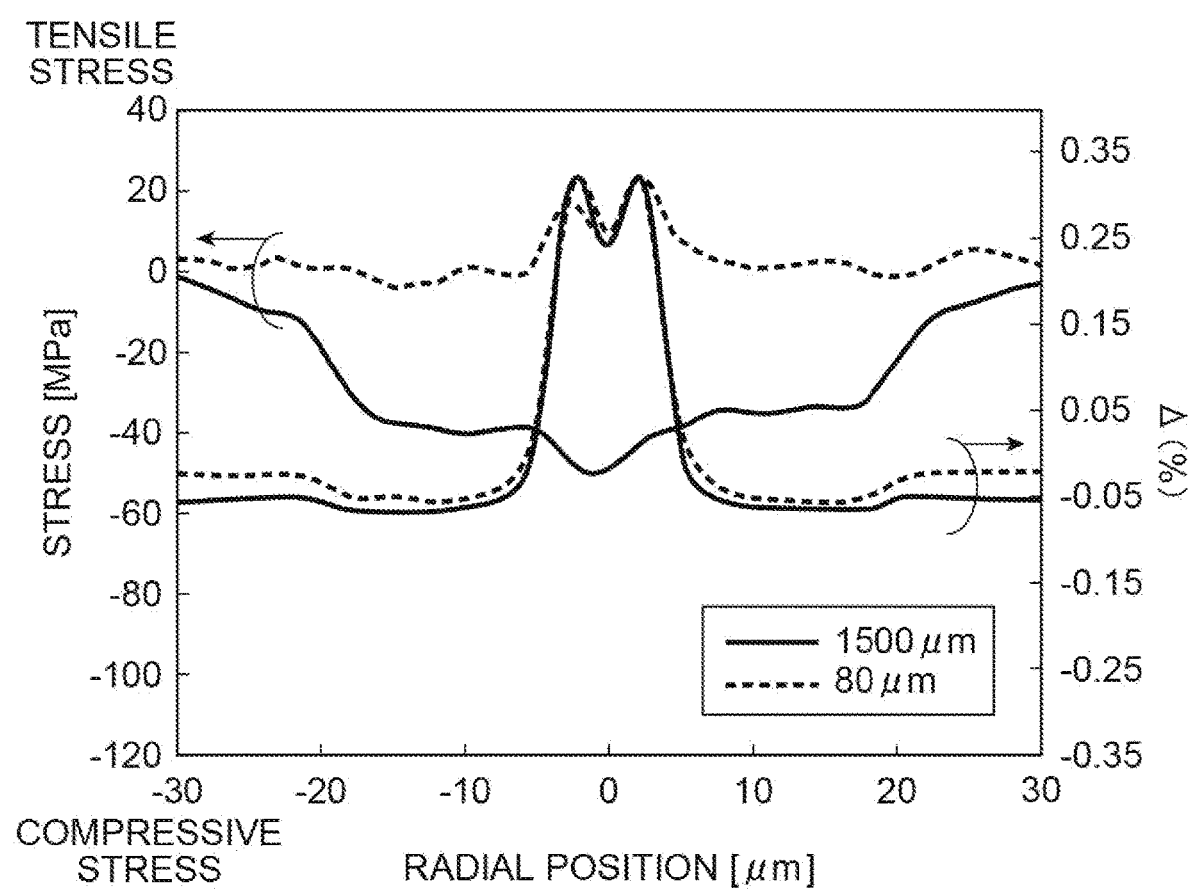
FIG. 6 is a graph showing a residual stress profile and a refractive index profile of an SMF according to the first example along a diameter of the optical fiber.

FIG. 6 is a graph showing a residual stress profile and a refractive index profile of each of the SMFs according to the first example along a diameter of the optical fiber. A horizontal axis and a vertical axis are the same as in FIG. 5. The residual stress profile and the refractive index profile in the radial direction were each measured at positions which are at distances of 1500 µm and 80 µm from the fusion-spliced point. In each of the SMFs, a position at a distance of 1500 µm from the fusion-spliced point is a constant portion that is not affected by heat due to fusion-splicing.

As shown in FIG. 6, at a position which is at distance of 1500 µm from the fusion-spliced point, a compressive stress remains in the core and the cladding, and the compressive stress remaining in the core is higher than the compressive stress remaining in the cladding. On the other hand, at a position which is at a distance of 80 µm from the fusion-spliced point, it can be seen that the residual stress in the core and the cladding is released by the heat of the discharge, and as a result, the relative refractive index difference of the core with respect to pure silica is reduced, and the MFD is increased.

The following can be explained from the results of the behavior of the change in the MFD in the fiber length direction due to the discharge fusion-splicing in the first and second embodiments. That is, in the photosensitive fiber, the stress is released by applying heat to the core to which the residual tensile stress is imparted. Thus, the refractive index difference between the core and the first cladding is increased, so that the MFD can be reduced. However, when heat is further applied, F added to the first cladding diffuses into the core and the second cladding. As a result, the refractive index of the first cladding is increased and the diameter of the core is reduced, so that the MFD increases. Therefore, in order to reduce the MFD of the photosensitive fiber, the fusion-splicing may be performed in a temperature range in which the residual tensile stress is released but fluorine is not sufficiently diffused. That is, in the GFF according to the first example, it proved effective that, with the discharge needles shifted from both the ends of the photosensitive fiber toward the SMF side to thereby reduce a heat applied by discharge to the photosensitive fiber, the fusion-splicing was performed at a temperature lower than a temperature at which fluorine diffusion was caused.

REFERENCE SIGNS LIST 1 gain flattening filter
10 photosensitive fiber (first optical fiber)
11 core
12 first cladding
13 second cladding
20 single-mode fiber (second optical fiber)
R1 first section
R2 second section
R3 third section
R4 fourth section

The invention claimed is:
1. A gain flattening filter comprising:
a first optical fiber that includes a core, a first cladding surrounding the core from outside in a radial direction, and a second cladding surrounding the first cladding from outside in the radial direction and that has a uniform composition in a length direction; and a pair of second optical fibers fused to both ends of the first optical fiber in the length direction, wherein the first optical fiber has a first section in which a slanted refractive index grating is formed and a pair of second sections connecting both ends of the first section to the pair of second optical fibers, the first cladding contains a photosensitive material whose refractive index increases upon irradiation with light having a specific wavelength, in the core, a tensile stress remains in the first section, and an average mode field diameter of the second sections is larger than an average mode field diameter of the second optical fibers and smaller than an average mode field diameter of the first section.

2. The gain flattening filter according to claim 1,
wherein a difference between the average mode field diameter of the second sections and the average mode field diameter of the second optical fibers is 1.3 μm or less.

3. The gain flattening filter according to claim 1,
wherein the core comprises silica-based glass and does not contain a dopant in such an amount that a relative refractive index difference of more than 0.01% with respect to pure silica is provided, the first cladding contains fluorine, and a fluorine concentration of the first cladding is more than 0.40% and 0.75% or less in terms of a change in a relative refractive index with respect to pure silica.

4. The gain flattening filter according to claim 1,
wherein, in the first section, a minimum value of the tensile stress remaining in the core is 1 MPa or more and 200 MPa or less.

5. The gain flattening filter according to claim 4,
wherein, in the second sections, a stress remaining in the core is a tensile stress lower than the tensile stress remaining in the core in the first section or a compressive stress.

6. The gain flattening filter according to claim 1,
wherein the average mode field diameter of the first section is 11.0 μm or more and 15.0 μm or less, and
the average mode field diameter of the second optical fibers is 9.0 μm or more and 10.9 μm or less.

7. The gain flattening filter according to claim 1,
wherein, in the first section,
the core has a diameter of 8.0 μm or more and 10.5 μm or less, and
a relative refractive index difference of the core with respect to the first cladding is 0.16% or more and 0.36% or less.

8. The gain flattening filter according to claim 1,
wherein the first cladding has an inner peripheral region in contact with the core, and
the photosensitive material is contained in the inner peripheral region.

9. The gain flattening filter according to claim 1,
wherein mode field diameters of the pair of second optical fibers increase toward the both ends of the first optical fiber.

10. A method for manufacturing a gain flattening filter, the method comprising:
fusing a pair of second optical fibers onto both ends of a first optical fiber in a length direction, the first optical fiber being formed with a slanted refractive index grating and including a core, a first cladding surrounding the core from outside in a radial direction and containing a photosensitive material whose refractive index increases upon irradiation with light having a specific wavelength, and a second cladding surrounding the first cladding from outside in the radial direction, and the pair of second optical fibers each having a mode field diameter smaller than a mode field diameter of the first optical fiber, wherein the fusing includes heating the first optical fiber and the pair of second optical fibers such that temperatures of the pair of second optical fibers are higher than temperatures of both the ends of the first optical fiber, and a tensile stress remaining in the core is released at both end portions of the first optical fiber to reduce average mode field diameters at both the end portions of the first optical fiber.

11. The method for manufacturing a gain flattening filter according to claim 10,
wherein, in the fusing, a fusing temperature is 4000° C. or more and 6500° C. or less, and a fusing time is 0.1 seconds or more and 100 seconds or less.

12. The method for manufacturing a gain flattening filter according to claim 10, the method further comprising:
heating an end portion of each of the pair of second optical fibers to be fused to both the ends of the first optical fiber to thereby increase a mode field diameter of the end portion before the fusing, the end portion being disposed on a side to be fused to the first optical fiber.

13. The gain flattening filter according to claim 1,
wherein a boundary between the first section and the second sections of the first optical fiber is defined at a position where the average MFD of the first section is reduced by a preset amount.

* * * * *